Dec. 20, 1966  J. HOURDIAUX  3,292,491
PICTURE PROJECTION SYSTEMS
Filed Nov. 27, 1964  2 Sheets-Sheet 2
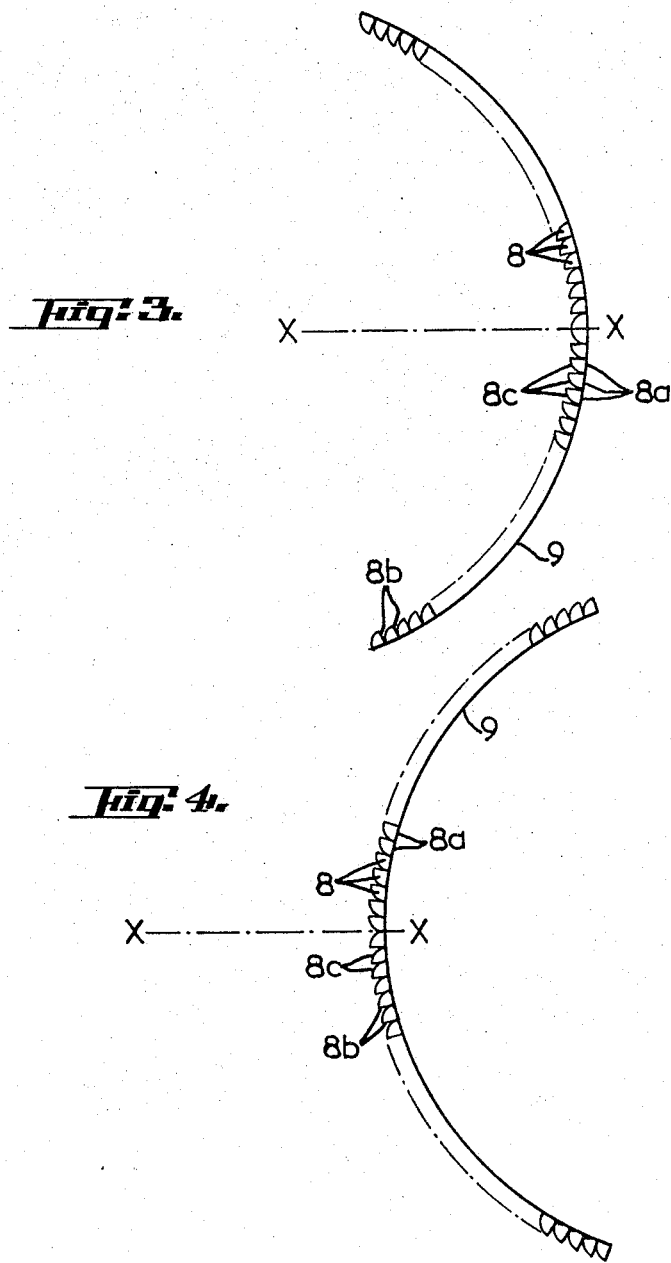

3,292,491
PICTURE PROJECTION SYSTEMS
Jules Hourdiaux, 96 Ave. de Versailles, Paris, France
Filed Nov. 27, 1964, Ser. No. 414,211
Claims priority, application France, Dec. 9, 1959,
812,558, Patent 1,252,668
1 Claim. (Cl. 88—24)

This is a continuation-in-part of parent application Serial No. 74,094, filed December 6, 1960, now abandoned.

The present invention relates to systems for projecting pictures either fixed or moving, that is to say to systems including a projection apparatus and a screen.

The chief object of the present invention is to provide a system of this kind which is better adapted to meet the requirements of practice than those known up to the present time.

The invention consists chiefly, in systems of the kind in question, in making use of a curved screen (either concave or convex) the relative depth of which (that is to say the ratio of its maximum sagitta to the length of its chord) is greater than $\frac{1}{10}$ and in arranging the single projecting apparatus so that it forms an image (of the film or plate) which is curved and coincides substantially with the surface of said screen.

Preferred embodiments of the present invention will be hereinafter described with reference to the accompanying drawings, given merely by way of example and in which:

FIGURE 3 is a plan view of a screen for use in a system as illustrated by FIGURE 1.

FIGURE 4 is a plan view of a screen for use in a system according to FIGURE 2.

The picture projection system comprises a projection apparatus and a screen 2, both mounted along axis XX, the projection apparatus itself comprising an optical device 1, a light source 5 and means (not shown) for bringing a flat film 6 in position between light source 5 and optical device 1. Screen 2 has a curved surface and its relative depth, that is to say the ratio of its maximum sagitta $f$ to the length of its chord $c$ is greater than $\frac{1}{10}$. As for the optical device of the single projection apparatus, it is capable of giving in space an image of film 6 which is curved as indicated by dotted line 7 and coincides substantially with the surface of the screen.

Figure 1:
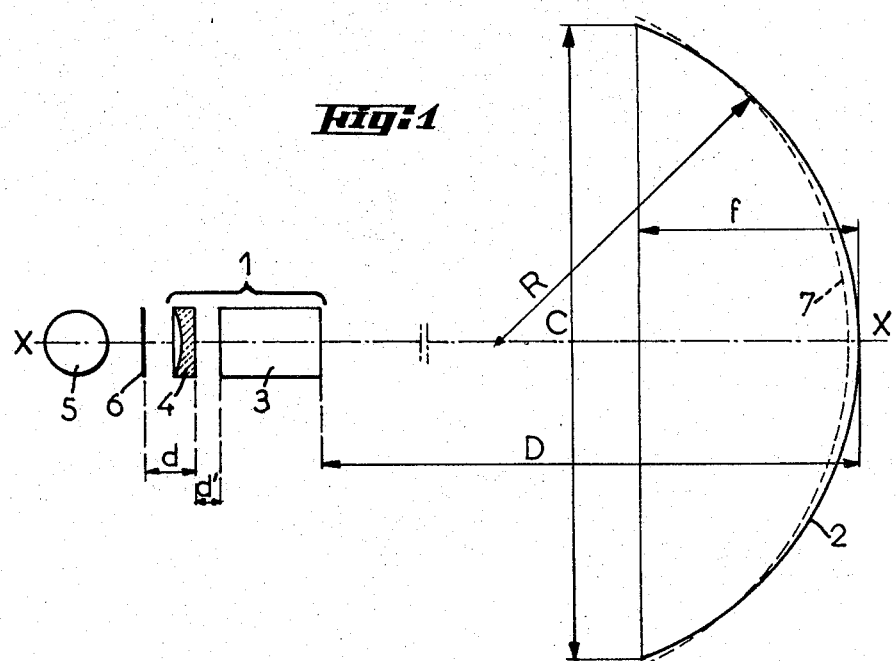
FIGURE 1 is a horizontal sectional view of a picture projection system made according to a first embodiment of the invention.
Figure 2:
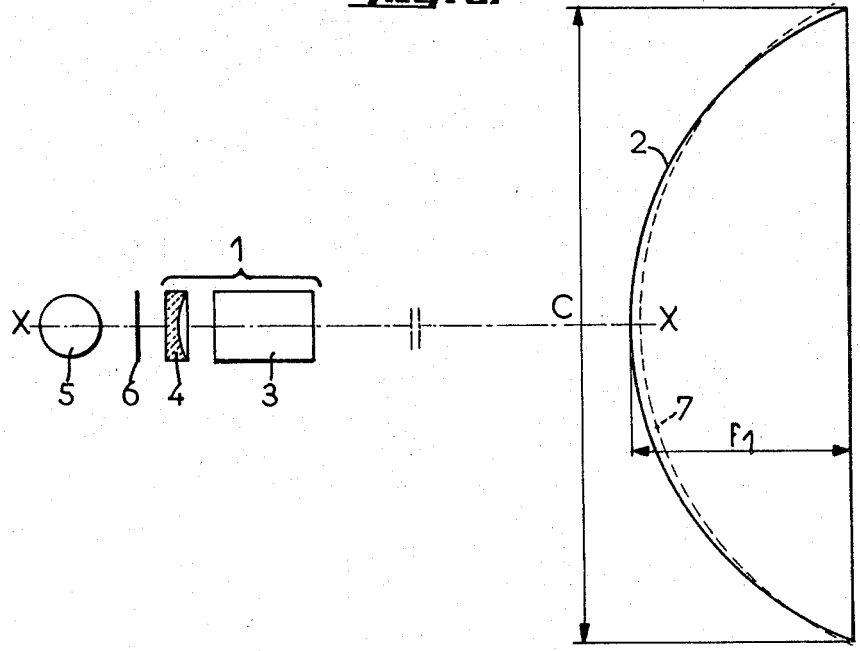
FIGURE 2 is a view similar to FIGURE 1 corresponding to a modification.

The screen may be either concave as shown in FIGURE 1 or convex as shown in FIGURE 2 where the sagitta is designated by reference $f_1$.

The surface of the screen may be curved both in the horizontal direction and in vertical direction having for instance the shape of a portion of a sphere. However, it seems simpler, to obtain a similar visual effect, to make the screen surface curved in only one of the two above mentioned directions and in particular in the horizontal direction. In this case, said surface is cylindrical, with vertical generatrices, the directrix of the cylindrical surface (visible on FIGURES 1 and 2) being for instance a circular or ellipse arc, a basket handle curve or any similar one.

As for optical device 1, it may be made directly to form the above mentioned curved image, advantage being taken of the field curvature aberrations which are usually more or less corrected. However, in order to avoid a costly transformation of existing projection apparatus capable of giving flat images, it is more advantageous to constitute optical device 1 by the combination of a conventional projection lens system 3, for example a wide angle lens system with short focal length such as the "Ciné-Star G.C." made by Etablissements Benoist-Berthiot-France and of optical means 4, consisting of a lens or combination of lenses, disposed between the above mentioned device 3 and source 5 and capable of transforming into a curved image 7 the flat image that would otherwise be given by the conventional projection lens system 3. It must be pointed out that projection lens systems may comprise an anamorphotic system such as the Hypergonar lens system of Professor Chrétien. Optical means 4 may be constituted by a plano-concave lens of revolution about its axis, for instance a spherical lens, or by a meniscus the curved limit surface or surfaces of which are convex toward the screen of FIGURE 1 or concave toward the screen of FIGURE 2.

According to a preferred form of embodiment optical means 4 comprises a plano-concave lens made of ordinary crown and having the following characteristics:

Focal length _____ mm__ 65
Diameter _____ mm__ 50
Thickness along the optical axis _____ mm__ 2
Radius of the curved surface _____ mm__ 32.5
Index of refraction _____ $n=1.5$ Said plano-concave lens was used in combination with a conventional projection lens system of the "Ciné-Star G.C." type, mentioned hereinabove. Said combination was used for projecting a flat picture on a concave screen of circular section having an aperture of 180° (that is to say a screen the relative depth of which is 2) and a radius $R=400$ mm. (see FIGURE 1).

The picture to be projected was a rectangular flat picture measuring 18 x 24 mm. The plano-concave lens was disposed between the projection lens system and the picture, its curved surface being convex toward the screen, at a preferably constant distance $d$, for instance 20 mm., from the latter (the distance $d$ being taken from the plane of the flat picture to the plane surface of the lens). The chosen projection distance D, taken from the rear lens of the projection lens system (with regard to the direction of light) was $D=1900$ mm.

The distance $d'$ between the rear surface or plane surface of the plano-concave lens and the front lens of the projection lens system is determined by the location of the projection lens system along the optical axis, this location being so chosen that the curved image of the flat picture coincides substantially with the surface of the screen and covers the entire width of said screen.

By using projection lens systems of the type mentioned hereinabove, but having different focal lengths, F, the value of $d'$ as a function of F is as follows:

| F (millimeters) | $d'$ (millimeters) |
|---|---|
| 50 | 10 |
| 60 | 20 |
| 75 | 32 |

Concerning the screen, when it has a substantially cylindrical surface (with its generatrices parallel to the small size of the screen that is to say vertical) it is advantageously constituted by a multiplicity of juxtaposed rods 8 (FIGURES 3 and 4) parallel to said generatrices and such that one of their flat faces, designated by reference 8a, is applied against a curved surface 9 analogous to the surface defined in the preceding figures, that their other flat faces, designated by reference 8b, are perpendicular to said surface, and that if, for purposes of explanation, the screen is divided into two halves by a vertical plane of symmetry, the flat faces 8b or the curved faces 8c of one half are turned toward the corresponding faces of the other half, according as the screen is concave (FIGURE 3) or convex (FIGURE 4).

Any spectator thus receives an improved visual impression of the image and a maximum light flux, whatever be his distance from the vertical plane passing through optical axis XX.

Furthermore, in the case of a concave screen, the images received directly by any portion of the screen are not reflected by another portion of said screen.

What I claim is:

In a picture projection system comprising a light source and a flat picture to be projected, an optical system, plano-concave lens disposed between said flat picture and said optical system for forming a sharp curved image of said flat picture, a projection screen having a substantially cylindrical surface with vertical generatrices, said screen having a ratio of the maximum sagitta of any cross-section of said surface to the length of the chord of said cross-section which is greater than $1/10$, said plano-concave lens and optical system being cooperative to provide a curved image which is in approximate concurrence with the curved screen, said projection screen consisting of a multiplicity of juxtaposed rods of quarter round cross-section extending parallel to said generatrices and having one flat face extending perpendicular to said cylindrical surface, said rods being arranged in two groups forming mirror images on said cylindrical surface with respect to the longitudinal plane of symmetry thereof.

References Cited by the Examiner

UNITED STATES PATENTS

| | | | |
|---|---|---|---|
| 2,060,817 | 11/1936 | Mahoney | 88—28.9 |
| 2,290,287 | 7/1942 | Links et al. | 88—24 X |
| 2,857,805 | 10/1958 | O'Brien | 88—28.9 X |
| 3,026,770 | 3/1962 | Smith | 88—28.9 |

NORTON ANSHER, *Primary Examiner.*